United States Patent [19]
Perumal et al.

[11] Patent Number: 5,811,498
[45] Date of Patent: Sep. 22, 1998

[54] α-GLYCOL ENDCAPPED RESINS, THEIR METHOD OF MANUFACTURE, AND COMPOSITIONS CONTAINING THE SAME

[75] Inventors: Pillai T. Perumal, Lindenhurst; Walter R. Pedersen, Chicago; Roger W. Hoch, Winthrop Harbor, all of Ill.

[73] Assignee: The Dexter Corporation, Windsor Locks, Conn.

[21] Appl. No.: 835,829

[22] Filed: Apr. 16, 1997

[51] Int. Cl.$^6$ ............ C08G 59/14; C08G 59/20; C08G 59/24

[52] U.S. Cl. ............ 525/523; 525/481; 525/510; 428/35.8; 428/36.9; 428/36.92; 428/418; 427/386; 528/103; 528/110

[58] Field of Search .................. 428/418, 35.8, 428/36.9, 36.92; 427/386; 525/481, 510, 523

[56] References Cited

U.S. PATENT DOCUMENTS

| | | | |
|---|---|---|---|
| 4,164,487 | 8/1979 | Martin | 260/29.2 EP |
| 4,289,812 | 9/1981 | Martin | 427/379 |
| 4,324,822 | 4/1982 | Kobayashi et al. | 428/35 |
| 4,397,970 | 8/1983 | Campbell et al. | 523/402 |
| 4,820,784 | 4/1989 | Massingill, Jr. et al. | 525/481 |
| 5,387,625 | 2/1995 | Parekh et al. | 523/404 |

*Primary Examiner*—Frederick Krass
*Attorney, Agent, or Firm*—Marshall, O'Toole, Gerstein, Murray & Borun

[57] ABSTRACT

A method of manufacturing phosphate-free alpha-glycol endcapped resins, and use of the resins in a coating composition, are disclosed. The alpha-glycol endcapped resins are prepared from a linear polymer terminated with phenol end groups and glycidol in the absence of phosphoric acid. The endcapped resins are incorporated into organic solvent-based coating compositions for application to metal substrates.

19 Claims, No Drawings

α-GLYCOL ENDCAPPED RESINS, THEIR METHOD OF MANUFACTURE, AND COMPOSITIONS CONTAINING THE SAME

FIELD OF THE INVENTION

The present invention relates to alpha-glycol (i.e., α-glycol) endcapped resins and their method of manufacture; to coating compositions containing an α-glycol endcapped resin; and to a metal article having at least one surface coated with an adherent layer of a coating composition containing an α-glycol endcapped resin. The α-glycol endcapped resins are prepared by interacting a linear resin having terminal phenolic groups with glycidol, in the absence of phosphoric acid. The α-glycol endcapped resins are incorporated into organic solvent-based coating compositions that are applied to metal substrates.

BACKGROUND OF THE INVENTION

It is well known that an aqueous solution in contact with an untreated metal substrate can result in corrosion of the untreated metal substrate. Therefore, a metal article, such as a metal container or a metal closure for a glass or plastic container, like a food product, is rendered corrosion resistant in order to retard or eliminate interactions between the aqueous product and the metal article. Generally, corrosion resistance is imparted to the metal article, or to a metal substrate in general, by passivating the metal substrate, or by coating the metal substrate with a corrosion-inhibiting coating.

Investigators continually have sought improved coatings to reduce or eliminate the corrosion of metal substrates. For example, investigators have sought to improve the imperviousness of the coating in order to prevent corrosion-causing ions, oxygen molecules, and water molecules from contacting and interacting with the metal substrate. Imperviousness can be improved by providing a thicker, more flexible and more adhesive coating, but often, improving one particular advantageous property is achieved at the expense of another advantageous property. For example, if the adhesive properties of a coating are improved, the flexibility of the coating can be adversely affected.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Epoxy-based coatings and polyvinyl chloride-based coatings have been used to coat the interior of metal containers for foods and beverages because these coatings exhibit an acceptable combination of adhesion to a metal substrate, flexibility, chemical resistance, and corrosion inhibition. However, epoxy-based coatings and polyvinyl chloride-based coatings have serious disadvantages which investigators are still attempting to overcome.

For example, coatings based on polyvinyl chloride or related halide-containing vinyl polymers, like polyvinylidene chloride, possess the above-listed advantageous properties of chemical resistance and corrosion inhibition, and are economical. However, curing a polyvinyl chloride or related halide-containing vinyl polymer can generate toxic compounds, such as hydrogen chloride gas. Disposal of polyvinyl chloride and related polymers also can produce carcinogenic dioxins and environmentally harmful hydrochloric acid.

Government regulators, therefore, are acting to eliminate the use of polyvinyl chloride-based coating compositions that contact food, and thereby eliminate the environmental and health concerns associated with halide-containing vinyl polymers. Presently, however, polyvinyl chloride-based compositions are still used to coat the interior of food and beverage containers.

To overcome these concerns, epoxy-based coating compositions have been used to coat the interior of food and beverage containers. However, epoxy-based coatings also possess disadvantages. For example, epoxy-based coating compositions are more expensive than polyvinyl chloride-based coating compositions. Epoxy-based coatings also can contain free amounts of the diglycidyl ether of bisphenol A (i.e., BADGE). BADGE monomer poses environmental and toxicological problems, and regulators are limiting the amount of free BADGE monomer present in coating compositions.

Investigators, therefore, have sought a coating composition for the interior of food and beverage containers that retain the advantageous properties of adhesion, flexibility, chemical resistance, and corrosion inhibition, and that are economical and do not adversely affect the taste or other esthetic properties of sensitive food and beverages packaged in the container. The present coating compositions, which are free of polyvinyl chloride and related halide-containing vinyl polymers, and are free of BADGE monomer, comprise: (a) an α-glycol endcapped resin, and (b) a crosslinking agent, such as a phenolic resin or an aminoplast, in (c) a nonaqueous carrier. The α-glycol endcapped resin is free of phosphate ester contaminants and by-products, and typically is an α-glycol endcapped epoxy resin or an α-glycol endcapped polyester-epoxy resin.

The present coating compositions provide all of the above-described advantageous properties, plus the advantages of a wide range of cure temperatures and improved flexibility over prior coatings. The coating compositions also overcome the environmental and toxicological problems associated with a polyvinyl chloride-based composition and free amounts of BADGE monomer.

Prior investigators have studied α-glycol endcapped resins as components in a coating composition. Such endcapped resins are desirable because the resins contain primary hydroxyl groups that are more readily crosslinked than either secondary hydroxyl groups or epoxy groups. However, prior investigators generated α-glycol endcapped resins by reacting an epoxy-containing polymer with phosphoric acid. This traditional method has the disadvantage of generating mono-, di-, and tri-esters of phosphoric acid in addition to an α-glycol endcapped resin.

The phosphoric acid generated α-glycol endcapped resins have several drawbacks, including: (1) the presence of the phosphate esters as a by-product, or contaminant, (2) the consumption of primary hydroxyl groups which are the desired crosslinking moieties, (3) the presence of hydrolyzable phosphate ester moieties in the cured coating composition, which can lead to decreased performance and, ultimately, to film failure, and (4) the presence of free phosphoric acid groups in the composition, which can adversely affect the water resistance of the cured coating compositions. Prior patents disclosing the reaction between an epoxide resin and phosphoric acid include Martin U.S. Pat. Nos. 4,164,487 and 4,289,812, Massingill, Jr. et al. U.S. Pat. No. 4,820,784, and Campbell et al. U.S. Pat. No. 4,397,970.

Although the above-identified patents disclose compositions for the interior of a food or beverage container, the references do not teach or suggest a composition containing an α-glycol endcapped resin that is free of phosphoric acid ester by-products, or a method of manufacturing such an α-glycol endcapped resin in the absence of phosphoric acid. The present invention, therefore, is directed to α-glycol endcapped resins that are free of phosphate ester contaminants, to methods of manufacturing the α-glycol endcapped resins, and to coating compositions containing the phosphate-free α-glycol endcapped resins. The coating compositions demonstrate an improved curing ability because of the presence of primary hydroxyl groups, and provide a cured coating composition having excellent (1) flexibility, (2) adhesion, (3) mar and scratch resistance, (4) chemical resistance, and (5) corrosion inhibition.

As an added advantage, the present coating compositions can be used both on can ends and on can bodies, thereby obviating the use of two different coating compositions by container manufacturers. Furthermore, the present coating compositions exhibit sufficient clarity, hardness, and mar resistance after cure for use as a coating on the exterior of a metal container.

Accordingly, because of improved chemical and physical properties, and because of the wide range of cure temperatures, a coating composition of the present invention has a more universal range of applications, such as for the interior coating of a metal container for food or beverage products or for the exterior coating of a metal container, and overcomes the environmental and toxicological concerns associated with a polyvinyl chloride-based coating and an epoxy resin-based coating.

SUMMARY OF THE INVENTION

The present invention is directed to coating compositions that, after curing, effectively inhibit corrosion of a metal substrate; do not adversely affect products packaged in a container having an interior surface coated with the compositions; and exhibit excellent flexibility, hardness, chemical resistance, and adhesion. The coating compositions also have an ability to cure over a wide range of temperatures, and can be used both on can ends and can bodies, and on container interiors and exteriors. The coating compositions effectively inhibit corrosion of ferrous and nonferrous metal substrates when the compositions are applied to a surface of the metal substrate, then cured for a sufficient time and at a sufficient temperature to provide a crosslinked coating. The crosslinked coatings have sufficient chemical and physical properties for use on the interior of containers used to package foods and beverages.

A present coating composition overcomes the disadvantages associated with prior polyvinyl chloride-based compositions, and prior epoxy resin-based compositions, and comprises: (a) an α-glycol endcapped resin, (b) a crosslinking agent, and a nonaqueous carrier, wherein the coating composition is free of a polyvinyl chloride or other halide-containing vinyl polymers and is free of the diglycidyl ether of bisphenol A. In addition, the α-glycol endcapped resins are prepared by a method which eliminates the presence of contaminating phosphate ester by-products. The α-glycol endcapped resins therefore exhibit an enhanced ability to crosslink.

In particular, the present coating compositions comprise: (a) about 5% to about 50%, by weight of the composition, of a phosphate-free α-glycol endcapped resin, (b) about 1% to about 15%, by weight of the composition, of a crosslinking agent, such as a phenolic resin or an aminoplast, and (c) a nonaqueous carrier. The present coating compositions are free of epoxy compounds, like BADGE monomer, that conventionally are present in epoxy resin-based coatings and α-glycol endcapped resins.

Components (a) and (b) of the coating composition are dispersed in a nonaqueous carrier such that the coating composition includes about 5% to about 50%, by weight of the composition, of nonvolatile components (a) and (b). Other optional components, such as a pigment, a wax, an additional resin, or an additive to enhance composition esthetics or performance, also can be included in the composition, and accordingly increase the weight percent of total nonvolatile material in the composition to above about 50% by weight of the coating composition.

As used here and hereinafter, the term "coating composition" is defined as a composition including an α-glycol endcapped resin, a crosslinking agent, and any optional ingredients dispersed in a nonaqueous carrier; the term "cured coating composition" is defined as the adherent polymeric coating resulting from curing a coating composition. The coating compositions and cured coating compositions are BADGE-free and phosphate ester free. The cured coating compositions comprise a phosphate-free α-glycol endcapped resin and a crosslinking agent, essentially in the amounts these ingredients are present in the coating composition.

Therefore, one important aspect of the present invention is to provide coating compositions that effectively inhibit the corrosion of ferrous and nonferrous metal substrates. The coating compositions, after application to a metal substrate, and subsequent curing at a sufficient temperature for a sufficient time, provide an adherent layer of cured coating composition that effectively inhibits corrosion, exhibits improved flexibility, mar resistance, and adhesion to the metal substrate, and does not adversely affect a product, like a food or beverage, that contacts the cured coating composition. Because of these advantageous properties, the cured coating compositions can be used to coat the interior of food and beverage containers and overcome the disadvantages associated with conventional polyvinyl chloride-based compositions and epoxy resin-based compositions.

In accordance with another important aspect of the present invention, the cured coating compositions demonstrate an excellent ability to cure. The improved ability to cure and crosslink is attributed to the α-glycol endcapped resin, which is free of phosphate ester by-products and, therefore, has a greater number of primary hydroxyl groups available for crosslinking. In turn, the absence of phosphate ester by-products in the α-glycol endcapped resin is attributed to the present method of manufacturing the α-glycol endcapped resins.

Yet another feature of the present invention is to provide a cured coating composition having excellent flexibility and adhesion to a metal substrate. The excellent adhesion of the cured coating composition to the metal substrate improves the corrosion-inhibiting properties of the coating composition. The excellent flexibility of the cured coating composition facilitates processing of the coated metal substrate into a coated metal article, like in molding or stamping process steps, such that the cured coating composition remains in continuous and intimate contact with the metal substrate.

The cured coating composition also exhibits excellent chemical resistance and does not adversely affect a food or beverage packaged in a container having an interior surface coated with the cured coating composition. The cured coating composition is sufficiently hard to resist scratching, even when cured at a temperature as low as about 380° F. (193° C.). Surprisingly, the coating composition can be cured over the range of about 380° F. (193° C.) to about 500° F. (260° C.) over a time period of about 8 seconds to about 30 seconds without adversely affecting the advantageous chemical and physical properties demonstrated by the cured coating composition.

In accordance with another important feature of the present invention, the α-glycol endcapped resins are prepared by a method that eliminates the generation and presence of phosphate ester by-products and eliminates the presence of free BADGE monomer. In particular, the α-glycol endcapped resins are prepared from a linear compound having a phenol moiety at each terminal end of the compound. The linear compound having terminal phenol moieties is reacted with glycidol, in the absence of phosphoric acid, to provide an α-glycol endcapped resin that is free of mono-, di-, and tri-esters of phosphoric acid, and that is free of BADGE monomer.

The compound having terminal phenol moieties can be prepared, for example, by reacting a linear compound having terminal epoxy groups with a dihydric phenol. The compound having terminal epoxy groups can be an epoxy resin, a polyester having terminal epoxy groups, or any other compound, oligomer, prepolymer, or polymer having a linear backbone and terminal epoxy groups.

In accordance with yet another important aspect of the present invention, a present coating composition that contains a phosphate-free α-glycol endcapped resin provides a cured coating composition that overcomes the disadvantages of prior epoxy resin-based and prior α-glycol endcapped resin-based coatings, and of conventional polyvinyl chloride-based coatings, used to coat the interior of containers for food and beverages. The present coating compositions overcome the health and environmental concerns associated with BADGE monomer and the polyvinyl chloride-based and related halide-containing vinyl polymers. The present coating compositions also demonstrate an improved cure and chemical resistance over prior compositions containing α-glycol endcapped resins because the α-glycol endcapped resin used in the present coating compositions are free of phosphate esters. In addition, the present composition can be used on both the interior and exterior of can ends and can bodies, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

A coating composition of the present invention, after curing, provides a cured coating composition that effectively inhibits the corrosion of metal substrates, such as, but not limited to, aluminum, iron, steel, and copper. The coating compositions, after curing, also demonstrate an improved adhesion to the metal substrate; an improved chemical resistance and scratch resistance; an improved flexibility; and an improved ability to cure over a wide temperature range. The cured coating compositions do not impart a taste to foods or beverages that contact the cured coating composition.

In general, a present coating composition comprises: (a) an α-glycol endcapped resin, typically, an α-glycol endcapped epoxy resin, an α-glycol endcapped polyester-epoxy resin, or a mixture thereof; and (b) a crosslinking agent, like a phenolic resin, an aminoplast, or a related crosslinking agent, dispersed in a nonaqueous carrier. In accordance with an important feature of the present invention, the α-glycol endcapped resin is free of phosphate ester by-products or contaminants and is free of BADGE monomer. The coating compositions also are free of a polyvinyl chloride-based polymer and other halide-containing vinyl polymers. In addition, the coating composition can include optional ingredients that improve the esthetics of the composition that facilitate processing of the composition or that improve a functional property of the composition. The individual composition ingredients are described in more detail below.

(a) α-Glycol Endcapped Resin

A coating composition of the present invention comprises an α-glycol endcapped resin in an amount of about 5% to about 50%, and preferably about 10% to about 40%, by weight of the composition. To achieve the full advantage of the present invention, the coating composition contains about 15% to about 40% of the α-glycol endcapped resin, by weight of the composition.

An α-glycol endcapped resin useful in the present composition has a number average molecular weight ($M_n$) of about 500 to about 20,000, and preferably is an α-glycol endcapped resin having an $M_n$ of about 1,000 to about 15,000. To achieve the full advantage of the present invention, the α-glycol endcapped resin has an $M_n$ of about 2,000 to about 10,000.

In accordance with an important feature of the present invention, the α-glycol endcapped resin is free of phosphate ester by-products and contaminants and also is free of BADGE monomer. It has been found that resins having primary hydroxyl groups facilitate crosslinking reactions and thereby contribute to the performance of cured compositions. Epoxy resins that have been hydrolyzed with phosphoric acid to generate an α-glycol endcapped resin also contain a substantial amount of mono-, di-, and tri-phosphate esters, thereby consuming primary hydroxyl groups and reducing the number of primary hydroxyl groups available for crosslinking during cure. Accordingly, α-glycol endcapped resins that are free of phosphate esters have an increased number of primary hydroxyl groups, and are desired. Therefore, the α-glycol endcapped resins utilized in the present coating compositions are prepared by a method that avoids the use of phosphoric acid.

In particular, an α-glycol endcapped resin of the present invention generally is prepared as follows. First, a linear difunctional compound is reacted with an epoxy compound to provide a linear compound having an epoxy group at each terminal end of the compound.

The linear difunctional compound can be a monomeric compound, like bisphenol A or a dicarboxylic acid, or can be an oligomer, prepolymer, or polymer, such as, for example, a carboxylic acid-terminated polyester resin. The linear difunctional compound has a general structural formula (I):

$$Y_1\text{-}X\text{-}Y_2, \quad (I)$$

wherein $Y_1$ and $Y_2$ are moieties having at least one active hydrogen atom, and X is a linear organic moiety. Moieties $Y_1$ and $Y_2$ can be the same or different. The term "active hydrogen atom" is defined as a hydrogen atom that is either capable of: (a) undergoing condensation or addition reactions with an epoxy or a hydroxy group, or (b) displacing a halogen.

The X moiety can be, for example, a hydrocarbon moiety, either alkyl, alkenyl, or alkynyl, having a carbon chain of one to about twenty carbon atoms, and preferably 2 to about 15 carbon atoms. To achieve the full advantage of the present invention, the hydrocarbon moiety has a carbon chain having 3 to about 10 carbon atoms. The X moiety also can be an aryl or an alkaryl group, for example, the alkaryl group of bisphenol A or the aryl and alkaryl groups of diphenols typically used by persons skilled in the art to prepare epoxy resins.

The X moiety also can be an oligomeric or a polymeric moiety, such as a polyester, a polyamide, a polyimide, a polyurethane, a polyether, a phenoxy, or a polyol, for example, having an $M_n$ of about 100 to about 10,000, and preferably about 200 to about 8,000. To achieve the full advantage of the present invention, a polymeric X moiety has a number average molecular weight of about 500 to about 6,000.

The $Y_1$ and $Y_2$ moieties are bonded to the opposite terminal ends of the linear X moiety. The $Y_1$ and $Y_2$ moieties can be any moiety having at least one active hydrogen atom. Nonlimiting examples of $Y_1$ and $Y_2$ moieties are hydroxy (OH), amino (NH$_2$), carboxyl (CO$_2$H), amido (CONH$_2$), sulfo (SH), and imido (CNH). Preferred $Y_1$ and $Y_2$ moieties are carboxyl and hydroxy moieties.

Nonlimiting examples of a linear difunctional compound (I) include, but are not limited to, α,ω-dicarboxylic acids, α,ω-diamines, α,ω-glycols, α,ω-diamides, and α,ω-dimercaptans, each having a carbon chain of 2 to about 20 carbon atoms; a carboxylic acid-terminated linear polyester having an $M_n$ of about 2,000 to about 5,000; a polyalkylene glycol, like polyethylene glycol, polypropylene glycol, polybutylene glycol, or a copolymer of ethylene glycol and propylene glycol, having an $M_n$ of about 100 to about 10,000; or a phenoxy resin having an $M_n$ of about 2,000 to about 10,000.

A linear difunctional compound (I) is capable of reacting with an epoxy compound, such as epichlorohydrin or glycidol for example, to provide a linear difunctional epoxy compound having terminal epoxy groups, e.g., a compound of general structural formula (II). The reaction is schematically illustrated below, using epichlorohydrin as the epoxy compound:

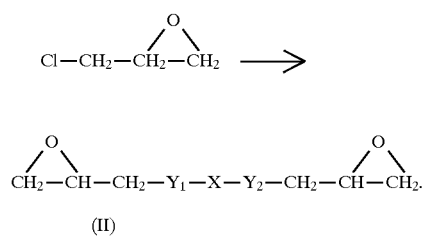

Linear difunctional compound (I) also can be reacted with an epoxy compound having two epoxy groups to provide a linear difunctional epoxy compound having terminal epoxy groups, i.e., a compound having the general structural formula (III):

$$\underset{H}{\overset{O}{\underset{|}{H_2C\text{---}C}}}\text{---}CH_2\text{---}O\text{---}Z\text{---}O\text{---}CH_2\text{---}\underset{H}{\overset{O}{\underset{|}{C\text{---}CH_2}}}, \quad (III)$$

wherein Z is a residue of a glycol or a diphenol compound.

For example, linear difunctional compound (I) can be reacted with the diglycidyl ether of bisphenol A:

Other epoxy compounds having two epoxy groups that can be reacted with a linear difunctional compound (I) include, but are not limited to:

When a linear difunctional compound (I) is reacted with an epoxy compound having one epoxy group, like epichlorohydrin or glycidol, a monomeric compound depicted by general structural formula (II) results. However, when a linear difunctional compound (I) is reacted with an epoxy compound having two epoxy groups, i.e., a compound of general structural formula (III), such as the diglycidyl ether of bisphenol A, chain extension occurs to provide a polymeric compound having the general structural formula (IV).

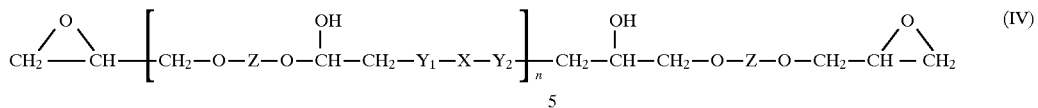

wherein n is a number from 1 to about 500.

Difunctional epoxy compounds (II) or (IV) then are reacted with a diphenol compound, such as bisphenol A, to provide a linear resin (V) having terminal phenol moieties and an $M_n$ of about 500 to about 300,000. The preparation of a linear resin (V) having terminal phenol moieties is illustrated schematically below, using bisphenol A as the diphenol compound and compound (IV) as the linear difunctional epoxy compound.

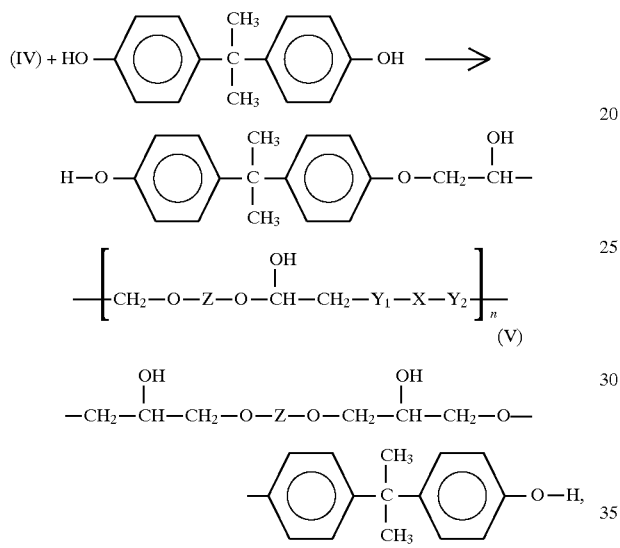

wherein n is a number from 1 to about 500.

Preferred linear resins having terminal phenol moieties (V) are prepared by the polymeric adduction of bisphenol-A to a linear difunctional epoxy compound (IV). However, in addition to bisphenol-A, a linear resin (V) can be prepared by reacting linear difunctional epoxy compound (IV) with an exemplary, but nonlimiting, bisphenol listed below:

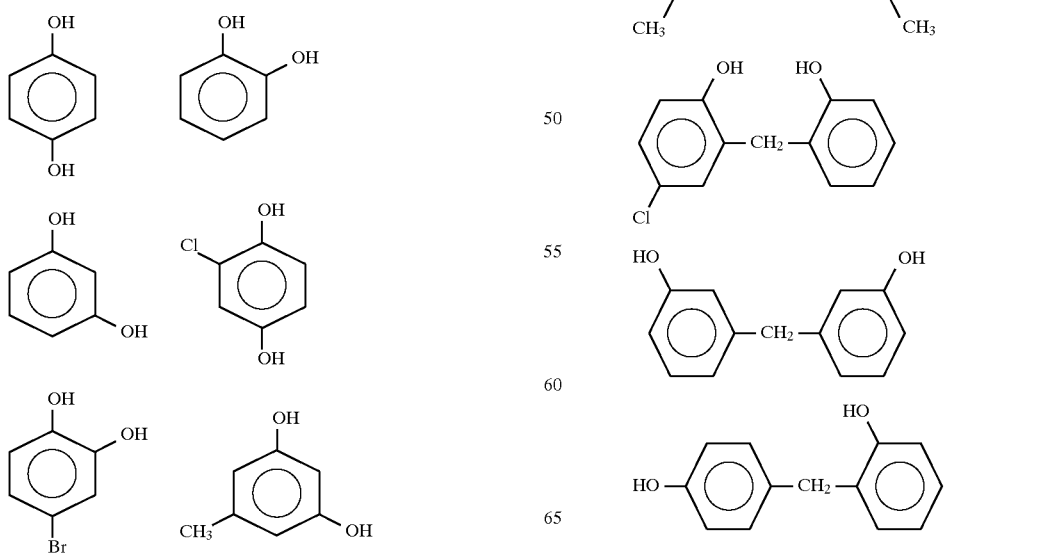

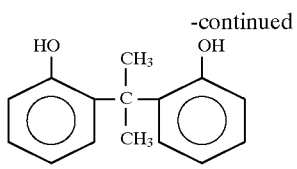
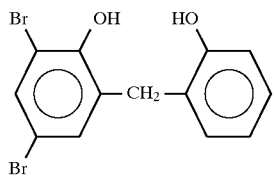
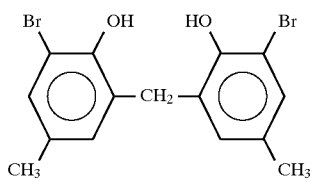
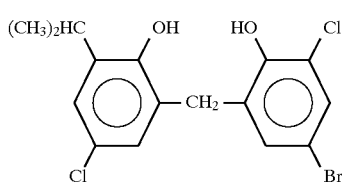
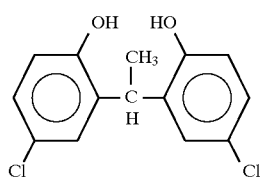
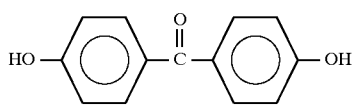
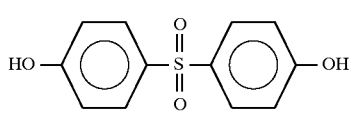
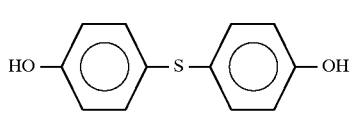
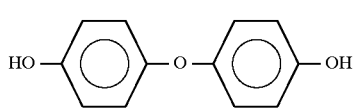
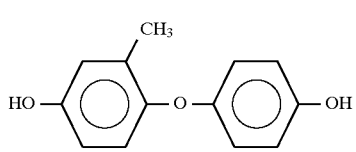
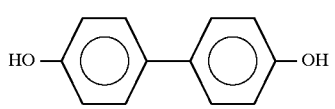

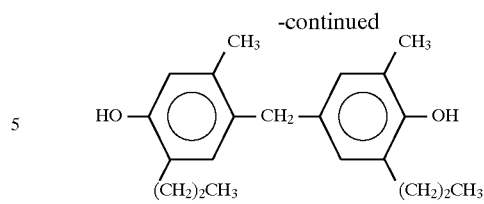

A linear resin (V) having terminal phenol moieties then is reacted with glycidol, as illustrated below, to provide an α-glycol endcapped resin (VI) that is free of phosphate ester and that is free of BADGE monomer.

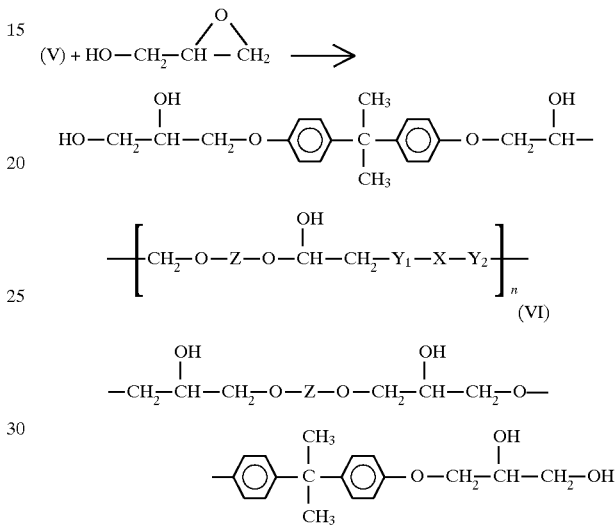

The following Examples 1–6 demonstrate the preparation of α-glycol endcapped resins of the present invention. In Examples 5 and 6, one mole of an epoxy resin having terminal epoxy groups was reacted with two moles of bisphenol-A, then with two moles of glycidol to provide a linear resin endcapped with α-glycol. The epoxy resin used in Examples 5 and 6 typically has an EEW of about 185 to about 6,000, and preferably about 750 to about 4,000. To achieve the full advantage of the present invention, the epoxy resin has an EEW of about 1,500 to about 3,000.

In Examples 1 and 2, carboxylic acid-terminated linear polyesters were prepared from neopentyl glycol and isophthalic acid. The linear polyesters of Examples 1 and 2 were converted into α-glycol endcapped resins in Examples 3 and 4. The linear polyesters typically have an $M_n$ of about 1,000 to about 6,000. Polyesters having an $M_n$ of about 2,000 to about 5,000 are preferred. The carboxylic acid-terminated polyesters were reacted with an epoxy resin having terminal epoxy groups to position terminal epoxy groups on the polyesters, i.e., compounds of general structural formula (IV). The epoxy-terminated polyesters then were reacted with bisphenol-A to provide a compound of general structural formula (V), followed by reaction with glycidol to provide a linear, α-glycol endcapped resin also having secondary hydroxyl groups, i.e., a compound of general structural formula (VI).

As discussed in detail hereafter, cure of the resulting α-glycol endcapped resin provided a flexible cured coating composition. Flexibility is an important property of cured coating compositions on metal substrates that are formed into metal containers. Flexibility is an important property because the metal substrate is coated prior to stamping or otherwise shaping the metal substrate into a desired metal article, such as a metal container. The flexibility of the cured coating is reflected in the enamel rating tests.

The coated metal substrate undergoes severe deformations during the shaping process, and, if a coating lacks sufficient flexibility, the coating can form cracks or fractures. Such cracks result in corrosion of the metal substrate because the aqueous contents of the container have greater access to the metal substrate. In addition, a cured coating provided by a composition of the present invention is sufficiently adhered to the metal substrate, and remains sufficiently adhered during processing into a metal article, and, therefore, further enhances corrosion inhibition.

The following examples illustrate preparation of linear polyesters and α-glycol endcapped resins of the present invention.

EXAMPLE 1

Preparation of Polyester A ($M_n$ 1000)

Neopentyl glycol (447.6 parts by weight), ethylene glycol (175.9 parts by weight), isophthalic acid (697.1 parts by weight), and dibutyl tin dilaurate (0.1 parts by weight) were charged into a three-necked vessel equipped with a stirrer, a packed column, a condenser, and a nitrogen inlet. The resulting reaction mixture was stirred and heated slowly to about 360° F. (182° C.) under a nitrogen blanket. The reaction mixture was maintained at a temperature of about 370° F. (188° C.), until 126.5 parts by weight water was distilled from the mixture, and the mixture became clear. Then, the reaction mixture was cooled to about 200° F. (93° C.), and adipic acid (679.5 parts by weight) was added to the mixture. The mixture then was reheated to about 400° F. (204° C.), and the water formed during the esterification reaction was continuously distilled from the reaction vessel. When the acid number of the reaction mixture was 113, the reaction mixture was cooled. The theoretical $M_n$ of the resulting polyester A was 1,000.

EXAMPLE 2

Preparation of Polyester B ($M_n$ 4,000)

Ethylene glycol (118.4 parts by weight), neopentyl glycol (616.9 parts by weight), isophthalic acid (484.8 parts by weight), and dibutyl tin dilaurate (0.2 parts by weight) were charged into an identical vessel used in Example 1. The resulting reaction mixture was stirred and heated slowly to about 350° F. (177° C.) under a nitrogen blanket. The reaction mixture was maintained at a temperature of about 390° F. (199° C.) to remove 70 parts of water. The mixture became clear. Then, the reaction mixture was cooled to about 230° F. (110° C.), adipic acid (779.8 parts by weight) was added, and the reaction mixture was reheated slowly to about 400° F. (204° C.). When the acid number of the reaction mixture was 29.2, the reaction mixture was cooled. The theoretical $M_n$ of the resulting polyester B was 4,000.

EXAMPLE 3

α-Glycol Endcapped Resin A

Epoxy resin EPON 1002, available from Shell Chemical Co., Houston, Tex., (650.8 parts by weight, EEW 650.8, 0.5 mole), carboxylic acid-terminated polyester A of Example 1 (248.3 parts by weight, 0.25 mole), cyclohexanone (224.8 parts by weight), and dimethylbenzylamine (0.2 parts by weight) were charged into a three-necked vessel equipped with a stirrer, condenser, and a nitrogen inlet. The resulting reaction mixture was heated under a nitrogen blanket to about 350° F. (177° C.) and was held at this temperature for about five hours until all the acid functionality had reacted, (i.e., the acid number of the reaction mixture was zero). Then, the reaction mixture was cooled to about 180° F. (82° C.), and bisphenol-A (114 parts by weight, 0.5 mole), and phosphonium catalyst RS-1201 (0.3 parts by weight) were added to the mixture. The resulting reaction temperature was reheated to about 350° F. (177° C.) and was held at this temperature. The progress of the epoxy-phenolic reaction was monitored by measuring EEW of the reaction mixture. The reaction was stopped when the mixture had an EEW value of about 42,000. Then, the reaction mixture was cooled to about 250° F. (121° C.) and glycidol (37.1 parts by weight, 0.5 mole) and phosphonium catalyst RS-1201 (0.2 parts by weight) were added to the mixture. The temperature of the mixture was raised again to about 350° F. (177° C.) and was maintained at 350°–360° F. (177°–182° C.) until all the epoxy groups of the glycidol had reacted, as indicated by EEW measurements. The final EEW value was 52,000. Then, the reaction mixture was cooled to about 210° F. (99° C.), and reduced with cyclohexanone (349.7 parts by weight) and methyl isobutyl ketone (718.1 parts by weight) to provide a reaction product including 45% by weight solids of a linear, phosphate-free α-glycol endcapped resin A. The α-glycol endcapped resin A was free of BADGE monomer.

EXAMPLE 4

α-Glycol Endcapped Resin B

Following the procedure set forth in Example 3, α-glycol endcapped resin B was prepared from 325.4 parts by weight of the resin EPON 1002, available from Shell Chemical Co., 480.4 parts by weight of polyester B of Example 2, 201.5 parts by weight of cyclohexanone, and 0.2 parts of dimethylbenzylamine. After the reaction was completed, the reaction mixture was cooled to about 180° F. (82° C.), followed by the addition of 57 parts by weight of bisphenol-A and 0.2 parts by weight of RS-1201 phosphonium catalyst. After all the epoxy groups had reacted, as measured by the EEW (i.e., 25,000), cyclohexanone (168.5 parts) and glycidol (18.5 parts) and phosphonium catalyst (0.2 parts) were added. The temperature then was raised to about 350° F. (177° C.) and was maintained until all the epoxy groups of the glycidol had reacted (i.e., final EEW value of about 38,000). Then, the reaction mixture was cooled to about 210° F. (99° C.) and was diluted with cyclohexanone (179 parts) and methyl isobutyl ketone (332.5 parts) to provide the linear, phosphate-free, α-glycol endcapped resin B. The α-glycol endcapped resin A was free of BADGE monomer.

EXAMPLE 5

Preparation of α-Glycol Endcapped Resin C

An epoxy resin, EPON 1007, available from Shell Chemical Co. (800 parts by weight, EEW about 1,809, 0.2211 mole), bisphenol-A (100.8 parts by weight, 0.4421 mole), phosphonium catalyst RS-1201 (0.4 parts by weight, available from Shell Chemical Co., Houston, Tex.), and cyclohexanone (100.1 parts by weight) were charged into a three-necked vessel equipped with stirrer, condenser, and a nitrogen inlet. The resulting reaction mixture was heated under a nitrogen blanket to about 320° F. (160° C.). A reaction exotherm raised the temperature of the reaction mixture to about 350° F. (177° C.) within about 15 minutes. After the exotherm, the reaction mixture was maintained at about 350° F. (177° C.) for about two hours to attain an EEW value of about 19,000. Then, the reaction mixture was cooled to about 280° F. (138° C.) and glycidol (32.5 parts by weight, available from Aldrich Chemical Co., Milwaukee, Wis.) and RS-1201 phosphonium catalyst (0.2 parts by weight) were added to the mixture. The reaction mixture was heated to about 350° F. (177° C.) and was held at 350°–360° F. (177°–182° C.) for 1.5 hours to reach an EEW value of about 20,000. Then, the reaction mixture was cooled to about 210° F. (99° C.), and next was diluted with 833.5 parts by weight of cyclohexanone to provide a linear, phosphate-free, α-glycol endcapped resin C solution containing about 50% by weight solids. The α-glycol endcapped resin C was free of BADGE monomer.

EXAMPLE 6

Preparation of α-Glycol Endcapped Resin D by an Advancement Reaction

Liquid epoxy resin EPON 828, available from Shell Chemical Co. (1000.0 parts by weight, EEW 185–188, 5.33 eq), bisphenol-A (739.3 parts by weight, 6.49 eq), and RS-1201 phosphonium catalyst (0.3 parts by weight) were charged into a three-necked vessel equipped with stirrer, condenser and a nitrogen inlet. The resulting mixture was heated under a nitrogen blanket to about 320° F. (120° C.), and an exothermic reaction raised the temperature to about 350° F. (177° C.) within about 15 minutes. After the exotherm, the reaction mixture was maintained at about 350° F. for about 1 hour to provide a phenol endcapped advanced epoxy resin having an EEW of about 144,000. Then, the reaction mixture was cooled to about 300° F. (149° C.), and glycidol (84.5 parts by weight, 1.14 mole) and RS-1201 phosphonium catalyst (0.2 parts by weight) were added. Next, the temperature of the reaction mixture was raised to about 350° F. (177° C.) and was maintained at 350°–360° F. (177°–182° C.) for about 6 hours until all the epoxy groups in glycidol had reacted. The EEW value of the resulting α-glycol endcapped epoxy resin D was 85,500. This resin was diluted with cyclohexanone (1630.6 parts by weight) to provide with a linear, phosphate-free, α-glycol endcapped resin solution having 50%. solids content. The α-glycol endcapped resin D was free of BADGE monomer.

(b) Crosslinking Agent

The coating compositions of the present invention also contain about 1% to about 15%, and preferably 2% to about 10%, by weight of the composition, of a crosslinking agent. To achieve the full advantage of the present invention the coating compositions contain about 2.5% to about 8%, by weight of the composition, of a crosslinking agent. Within this range, the crosslinking agent provides a useful coating composition, and a useful cured coating composition.

The crosslinking agent can be a phenolic resin, an aminoplast, a carbodiimide, or a similar curing agent. The phenolic resin is a condensation product resulting from a reaction between a phenol and formaldehyde, and has a low $M_n$ of about 300 to about 8,000, and preferably about 500 to about 5,000. Phenol, or essentially any other compound having a hydroxyphenyl moiety, can be used as the phenol component of the phenolic resin. Nonlimiting examples of suitable phenol compounds include phenol, cresylic acid, and bisphenol A. Bisphenol A is the preferred phenol component of the phenolic resin.

Similarly, an aminoplast can be used as the crosslinking agent. An aminoplast generally is a low molecular weight partially or fully alkylated condensation product, like urea-formaldehyde, melamine-formaldehyde, and benzoguanamine-formaldehyde resins.

Commercially available aminoplasts include, for example, CYMEL 301, CYMEL 303, CYMEL 370, and CYMEL 373, all being melamine-based and commercially available from Cytec Industries, Stamford, Conn., e.g., CYMEL 301 and CYMEL 303 are hexamethoxymethylmelamine resins.

Other examples of aminoplast resins are of the type produced by the reaction of an aldehyde and formal guanamine; benzoguanamine; acetoguanamine; ammeline; 2-chloro-4,6-diamine-1,3,5'triazine; 2-phenyl-p-oxy-4,6-diamino-1,3,5-triazine; and 2,4,6-triethyl-triamino-1,3,5-triazine. The mono, di, or triaryl melamines, for instance, 2,4,6-triphenyl-triamine-1,3,5-triazine, are preferred. Other aldehydes used in a reaction with the amino compound to form a resinous aminoplast are crotonaldehyde, acrolein, or compounds which generate aldehydes, such as hexamethylenetetramine, paraldehyde, and the like.

(c) Optional Ingredients

A coating composition of the present invention also can include optional ingredients that do not adversely affect the coating composition or a cured coating composition resulting therefrom. Such optional ingredients are known in the art, and are included in the composition to enhance composition esthetics; to facilitate manufacturing, processing, handling, and application of the composition; and to further improve a particular functional property of the coating composition or a cured coating composition resulting therefrom.

Such optional ingredients include, for example, additional resins, waxes, dyes, pigments, extenders, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount that adversely affects the basic coating composition or a cured coating composition resulting therefrom. For example, up to about 1% by weight of nonvolatile material of a wax, like a paraffin wax or lanolin, is included in the coating composition to assist in lubricating and handling a metal substrate coated with the cured coating composition.

In addition, an additional resin, or resins, can be incorporated into the coating compositions in order to impart a desired property. For example, an epoxy resin can be added to improve the chemical and mar resistance of a cured coating composition containing an α-glycol endcapped resin of the present invention.

Nonaqueous Carrier

The present coating compositions are non-aqueous compositions, in which the α-glycol endcapped resin and crosslinking agent, along with optional ingredients, are homogeneously dispersed in a nonaqueous carrier. The present coating compositions can include a relatively low amount of water, such as up to about 0.5% by total weight of the composition, without adversely affecting the coating composition, either prior to or after curing. The water can be added to the composition intentionally, or can be present in the composition inadvertently, such as when water is present in a particular component included in the coating composition.

In general, the nonaqueous carrier has sufficient volatility to evaporate essentially entirely from the coating composition during the curing process, such as during heating at about 380° F. (193° C.) to about 500° F. (260° C.) for about eight to about thirty seconds. Suitable nonaqueous carriers are known in the art of coating compositions, and include, for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, methyl ethyl ketone, ethyl aryl ketones, methyl aryl ketones, diacetone alcohol and methyl isoamyl ketone; aromatic hydrocarbons, like toluene, benzene and xylene; aliphatic hydrocarbons, like mineral spirits, kerosene and high flash VM&P naphtha; alcohols, like isopropyl alcohol, n-butyl alcohol and ethyl alcohol; and aprotic solvents, like tetrahydrofuran; chlorinated solvents; esters; glycol ether esters, like propylene glycol monomethyl ether acetate; and combinations thereof.

The nonaqueous carrier typically is included in the composition in a sufficient amount to provide a composition having about 5% to about 50%, by weight of the composition, of the total weight of (a) and (b). The amount of nonaqueous carrier included in the composition is limited only by the desired, or necessary, rheological properties of the composition. Usually, a sufficient amount of nonaqueous carrier is included in the coating composition to provide a composition that can be processed easily, that can be applied to a metal substrate easily and uniformly, and that is sufficiently removed from the coating composition during cure within the desired cure time.

Therefore, essentially any nonaqueous carrier is useful in the present coating composition as long as the nonaqueous carrier adequately disperses and/or solubilizes the composition components; is inert with respect to interacting with composition components, and thereby adversely affecting the stability of the coating composition or the ability of the coating composition to effectively cure; and evaporates quickly, essentially entirely, and relatively rapidly to provide a cured coating composition that inhibits the corrosion of a metal substrate, that does not adversely affect a food or beverage that contacts the cured coating composition, and that demonstrates sufficient physical properties, like adhesion and flexibility, for use as a coating on the interior or exterior of a container.

A coating composition of the present invention is prepared by simply admixing the α-glycol endcapped epoxy resin, the crosslinking agent, and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the coating composition to adjust the amount of nonvolatile material in the composition to a predetermined level.

To demonstrate the usefulness of the coating compositions of the present invention, the following Examples and Comparative Examples were prepared, applied to a metal substrate, and then cured to provide a coated metal substrate. The coated metal substrates then were tested comparatively for use as the interior coating of a food or beverage container. The cured coatings were tested for an ability to inhibit corrosion of a metal substrate; for adhesion to the metal substrate; for chemical resistance; for flexibility; and for scratch and mar resistance. The following examples illustrate important embodiments of the compositions of the present invention and their method of manufacture.

In particular, experiments wherein an epoxy compound was hydrolyzed, either in the presence or absence of phosphoric acid, showed that α-glycol endcapped resins prepared in the absence of phosphoric acid provided cured films having improved chemical resistance, hardness, and flexibility. These improved features were attributed to α-glycol endcapped epoxy resins that were free of phosphate ester by-products and contaminants, and, in turn, that contained a greater number of primary hydroxyl groups.

In one set of experiments, the α-glycol endcapped resin of Example 5 was admixed with different crosslinking agents and other optional ingredients. The resulting coating compositions were applied as a 7 to 8 micron thick film to a metal substrate, then cured at about 470° F. (244° C.) to about 480° F. (249° C.) for about 12 seconds to provide a cured coating composition. In particular, the following compositions of Example 7 were prepared.

Example 7

| Ingredient | Weight % |
|---|---|
| Resin of Example 5 (50% by weight solids) | 95.9 |
| Crosslinking Agent | 3.0 |
| Lubricant[1] | 0.75 |
| Silicone Surfactant[2] | 0.35 |

[1]MICHEM 160, available from Michelman Chemical Co., Inc., Cincinnati, OH, a 25% active emulsion of carnauba wax; and
[2]BYK 310, available from Byk Chemie, Wallingford, CT, about a 25% active polyester modified silicone to aid wetting, flow, mar resistance, and slip.

The various crosslinking agents used in Example 7 were as follows:

Example 7a CYMEL 303 Resin, containing hexamethoxymethylmelamine resin, available commercially from Cytec Industries, Inc., Stamford, Conn.;

Example 7b CYMEL 1125 Resin, containing a carboxyl-modified benzoguanamine, available from Cytec Industries, Inc.; and Example 7c BECKAMINE 93-210, containing a precatalyzed urea, available from Reichhold Chemicals, Oak Brook, Ill.

The ingredients of Example 7 were blended to provide a homogeneous coating composition. The coating compositions of Examples 7a–7c were individually applied to a metal substrate, i.e., an aluminum panel, as a coating of about 8 microns in thickness. After curing the coating compositions of Example 7a–7c on the metal substrate at about 480° C., for about 12 seconds, the cured coating compositions were tested for enamel rating, blush, and adhesion to the metal substrate. Table 1 summarizes the results of tests performed on the cured coating compositions of Examples 7a–7c.

TABLE 1

| Test | Example 7a | Example 7b | Example 7c |
|---|---|---|---|
| Blush Resistance (after 15 min. in boiling DOWFAX[3]) | 20[4] | 20 | 20 |
| Adhesion (after 15 min. in boiling DOWFAX[3]) | 100[6] | 100 | 100 |
| Enamel Rating (as is) | | | |
| $\bar{X}$[6] | 26.8 | 0.83 | 1.2 |
| s | .28 | 0.5 | 0.7 |

TABLE 1-continued

| Test | Example 7a | Example 7b | Example 7c |
|---|---|---|---|
| Enamel Rating (after 5 min. in boiling DOWFAX[3]) | | | |
| $\bar{X}$ | 40 | 2.8 | 4.5 |
| s | 35 | 1.4 | 3.1 |

[3]DOWFAX 2A1, an anionic surfactant, available from Dow Chemical Co., Midland, MI;
[4]100%—no blusing, 0%—complete blushing;
[5]$\bar{X}$-average of twelve replicate trials, s-standard deviation in milliamperes; and
[6]100—good adhesion, 0—poor adhesion.

The enamel rating tests the continuity of a coating film applied to a can part, such as a can end or a can body. A can end or can body is formed after the metal substrate is coated. Therefore, the cured coating has been deformed during this manufacturing step. The enamel rating test measures the passage of current from an electrode through an electrolyte to the formed can part. The coating functions as an insulator, and, accordingly, no current flows if film continuity is perfect. The lower the milliampere (mA) reading, the more continuous the coating on the metal substrate. In general, an enamel rating of about 5 or less is desired. The data summarized in Table 1 shows a very low milliampere reading for can parts coated with the compositions of Examples 7b and 7c, therefore showing good film continuity. Examples 7b and 7c demonstrated excellent film continuity in the enamel rating test both directly after curing the composition on the metal substrate, after contact with a boiling surfactant solution (i.e., DOWFAX 2A1) for five minutes.

The data presented in Table 1 also show that the cured coatings of Examples 7a–7c demonstrated good adhesion to the metal substrate. The cured coatings of Examples 7a–7c, therefore, have an ability to be deformed and still maintain adhesion to the metal substrate.

In another set of tests, citric acid, in an amount of 0.5% by weight based on solids, was added to each composition of Examples 7a–7c. The citric acid was added to each composition as a 10% by weight methanol solution of citric acid to provide the compositions of Examples 7a'–7c'. The compositions of Examples 7a'–7c' then were applied to a metal substrate and cured in the identical manner as Examples 7a–7c. Table 2 summarizes the results of tests performed on cured coating compositions 7a'–7c'.

TABLE 2

| | Example 7a' | Example 7b' | Example 7c' |
|---|---|---|---|
| Enamel Rating (as is) | | | |
| $\bar{X}$[5] | 1.2 | 0.9 | 0.9 |
| s | 1 | 0.6 | 0.6 |
| MEK[7] | 100 | 8 | 5 |

[7]methyl ethyl ketone rub test.

The data in Table 2 shows that the addition of an additional optional catalyst, e.g., citric acid, in Examples 7a'–7c', can improve cured film properties by further reducing the enamel rating of the cured coating composition in comparison to the cured coating compositions of Example 7a–7c. Furthermore, the MEK rub test shows that compositions containing an α-glycol endcapped resin of the present invention, e.g., Example 7a', has excellent chemical resistance.

In particular, the MEK rub test measures resistance of a cured coating to chemical attack. In the MEK rub test, cheesecloth saturated with methyl ethyl ketone (MEK) is rubbed back and forth against a coated metal panel using hand pressure. A rub back and forth is designated as one "double rub." In this test, the cured coating is rubbed until the MEK dissolves or otherwise disrupts the cured coating. Typically, a cured coating passes the MEK rub test if the coating is unaffected by fifty double rubs with the MEK saturated cloth composition. The composition of Example 7a' was unaffected by 100 double MEK rubs, thereby showing excellent chemical resistance, in addition to an excellent film continuity (e.g., enamel rating of about 1).

In another set of experiments, a composition containing the α-glycol endcapped resin of Example 6 was admixed with various crosslinking agents, applied to metal substrates as a film, then cured. In particular, each of the following Examples 8–14 were prepared, then cured coating compositions prepared therefrom were compared to a cured coating composition prepared from Comparative Example 1. The composition of Comparative Example 1 is a coating based on vinyl chloride resins, containing 30% nonvolatile material, and commercially available as 8510J05M from Dexter Packaging Products, Waukegan, Ill.

| Ingredient | Example 8[8] | Example 9 | Example 10 | Example 11 | Example 12 | Example 13 | Example 14 |
|---|---|---|---|---|---|---|---|
| α-Glycol Endcapped Resin of Example 6 | 57.54 | 57.54 | 57.54 | 95.90 | 54.54 | 57.54 | 57.54 |
| Epoxy Resin[10] | 38.36 | 38.36 | 38.36 | | 38.36 | 38.36 | 38.36 |
| Crosslinking Agent[11] | 3.00 | 3.00 | 3.00 | 3.00 | 3.00 | 3.00 | 3.00 |
| Lubricant[1] | 0.75 | 0.75 | 0.75 | 0.75 | 0.75 | 0.75 | 0.75 |
| Silicone Surfactant[2] | 0.35 | 0.35 | 0.35 | 0.35 | 0.35 | 0.35 | 0.35 |
| Citric Acid | | 0.50[9] | | | | | |
| MANGILL 53901[12] | | | 0.50[9] | | | | |
| Boric Acid | | | | | 0.50[9] | | |
| Tartaric Acid | | | | | | 0.50[9] | |
| Lactic Acid | | | | | | | 0.50[9] |

[8]% by weight in the composition;
[9]% by weight based on solids;
[10]EPON 1007;
[11]CYMEL 303; and
[12]MANGILL 53901, or organic phosphate, available from Mangill Chemical Co., Cleveland, Ohio.

The composition of Examples 8–14 and Comparative Example 1 individually were applied to an aluminum panel as a layer about 8 microns thick. The coating compositions were cured by heating the coated metal substrates in an oven at about 450° F. for about 12 seconds. The results of tests performed on the cured compositions are summarized in Table 3.

TABLE 3

| | MEK Test[7] | Wetting[13] | Adhesion[6] (DOWFAX)[3] | Blush[4] (DOWFAX)[3] | Enamel Rating[5] (Basic ends)[14] | Enamel Rating[5] (Converted ends)[14] |
|---|---|---|---|---|---|---|
| Ex. 8 | 0 | heavy | 100 | 0 | .24 | |
| Ex. 9 | 18 | moderate | 100 | 100 | | 1.5 ± 8 |
| Ex. 10 | 25 | moderate | 100 | 90 | | 2.4 ± 2.0 |
| Ex. 11 | 0 | very heavy | 100 | 0 | .24 | |
| Ex. 12 | 0 | slight | 100 | 0 | .24 | |
| Ex. 13 | 0 | moderate | 100 | 100 | | 27.7 ± 29 |
| Ex. 14 | 0 | slight | 100 | 0 | .24 | |
| Comp. Ex. 1 | 0 | none | 100 | 60 | | .8 ± .7 |

[13]the wetting test is a subjective measure of the extent of dewetting; and
[14]basic ends are 206 mm diameter aluminum beer and beverage can ends, and converted ends are 206 mm diameter S.O.T. (stay on tab) aluminum beer and beverage ends.

The data summarized in Table 3 shows that coating compositions containing an α-glycol endcapped resin of the present invention provides coating compositions suitable for use on metal substrates, especially with respect to enamel rating (i.e., film continuity and adhesion).

The following composition of Example 15 also was prepared, then applied to a metal substrate as a film and cured at about 455° F. (235° C.) for about 12 seconds. The cured coating composition had sufficient properties to perform as a coating composition for metal substrates.

Example 15

| Ingredient | Amount (grams) |
|---|---|
| α-Glycol Endcapped Resin of Example 6 (51% nonvolatile material) | 135.0 g |
| EPON 1007 Epoxy Resin (39.55% nonvolatile material) | 45.51 g |
| Citric Acid (10% nonvolatile material) | 4.5 g |
| CYMEL 303 (30% nonvolatile material) | 6.75 g |
| Lubricant[1] | 2.27 g |
| Xylene | 74.47 g |
| Butyl Acetate | 31.5 g |
| Total | 300 grams |

The properties of the cured coating composition of Example 15 were improved by adding about 0.35% by weight of nonvolatile material of a silicone surfactant, like BYK 310, which improves wetting of the metal substrate, and by increasing the amount of crosslinking agent, e.g., CYMEL 303, to about 3% by weight nonvolatile material, which improves the blush resistance of the cured coating composition.

In another experiment, a composition of Comparative Example 2 was prepared, then compared to the α-glycol endcapped resin of Example 6 as coating compositions for metal substrates. Comparative Example 2 is similar to Example 6, however, the α-glycol endcapped resin of Comparative Example 2 was prepared using phosphoric acid, and, accordingly, contains phosphate ester by-products. Example 6, prepared by the method of the present invention, is free of phosphate ester contaminants and by-products.

Comparative Example 2

| Ingredient | Amount (in grams) |
|---|---|
| EPON 828 (EEW 187) | 1100.0 |
| Bisphenol A | 532.8 |
| Catalyst R-1201 | 0.2 |
| Butyl Cellosolve | 879.2 |
| Phosphoric Acid (88%) | 8.8 |
| Deionized Water | 194.0 |
| Butyl Cellosolve | 607.2 |

The composition of Comparative Example 2 is a chain extended epoxy resin having the epoxy groups hydrolyzed by phosphoric acid. Comparative Example 2 contained 50% by weight nonvolatile material, and had an EEW of about 176,000. The composition of Comparative Example 2 was applied as a 7 to 8 micron thick film to an aluminum substrate, and cured at about 380° F. (193° C.) to about 400° F. (204° C.) for about 8 to about 10 seconds, to provide a comparative cured coating composition.

The cured coating compositions of Comparative Example 2 are compared to cured coating compositions of Example 6. The cured coating compositions of Example 6 outperform Comparative Example 2 with respect to chemical resistance (i.e., MEK rub test) and blush resistance. The cured coating compositions of Comparative Example 2 and of Example 6 are essentially identical with respect to enamel rating, hardness, and adhesion.

The experiments summarized above demonstrate that a cured coating composition prepared from a phosphate-free, α-glycol endcapped resin of the present invention is flexible and maintains adhesion to the metal substrate; is sufficiently hard, and, therefore, is scratch and mar resistant; resists blush; and resists feathering. Cured coatings of the present invention demonstrated good hardness, blush resistance, enamel rating, and flexibility in comparative tests.

The properties demonstrated by an α-glycol endcapped resin of the present invention, and a cured coating resulting therefrom, show that elimination of phosphate by-products and contaminants provide improved cured epoxy or phenoxy-based coating compositions that can be used for the interior or exterior of containers, and especially food and beverage containers. The α-glycol endcapped resins of the present invention also eliminate the presence of the diglycidyl ether of bisphenol A. The elimination of BADGE compositions to overcome the adverse toxicological and environmental properties associated with BADGE.

Obviously, many modifications and variations of the invention as hereinbefore set forth can be made without departing from the spirit and scope thereof, and, therefore, only such limitations should be imposed as are indicated by the appended claims.

What is claimed is:

1. A coating composition for a metal substrate comprising:
    (a) about 5% to about 50%, by weight of the composition, of a phosphate-free α-glycol endcapped resin having an epoxy equivalent weight of about 20,000 to about 85,500, said α-glycol endcapped resin being the reaction product of
        (i) a linear resin having terminal phenol moieties, said linear resin being a reaction product of a linear difunctional epoxy compound having terminal epoxy groups and a diphenol compound, and
        (ii) glycidol;
    (b) about 1% to about 15%, by weight of the composition, of a crosslinking agent; and
    (c) a nonaqueous carrier.

2. The composition of claim 1 wherein the crosslinking agent comprises a phenolic resin, an aminoplast, a carbodiimide, or a mixture thereof.

3. The composition of claim 1 further comprising 0% to about 1%, by weight of the composition, of a wax.

4. The composition of claim 1 wherein the composition is free of a halide-containing vinyl polymer.

5. The composition of claim 1 wherein the α-glycol endcapped resin is selected from the group consisting of an α-glycol endcapped polyester-epoxy resin, an α-glycol endcapped epoxy resin, and a mixture thereof.

6. A method of coating a metal substrate comprising:
    (i) applying a coating composition to at least one surface of the metal substrate, said coating composition comprising:
    (a) about 5% to about 50%, by weight of the composition, of a phosphate-free α-glycol endcapped resin having an epoxy equivalent weight of about 20,000 to about 85,500, said α-glycol endcapped resin being the reaction product of
        (A) a linear resin having terminal phenol moieties, said linear resin being a reaction product of a linear difunctional epoxy compound having terminal epoxy groups and a diphenol compound, and
        (B) glycidol;
    (b) about 1% to about 15%, by weight of the composition, of a crosslinking agent, and
    (c) a nonaqueous carrier; and
    (ii) heating the metal substrate having the coating composition applied thereon for a sufficient time and at a sufficient temperature to remove the nonaqueous carrier from the composition and provide a crosslinked coating.

7. The method of claim 6 wherein the metal substrate having the coating composition applied thereon is heated for about 8 to about 30 seconds at a temperature of about 195° C. to about 260° C.

8. A metal article having at least one surface thereof coated with an adherent layer of a coating, said coating comprising:
    (a) about 5% to about 50%, by weight of the composition, of a phosphate-free α-glycol endcapped resin of having an epoxy equivalent weight of about 20,000 to about 85,500, said α-glycol endcapped resin being the reaction product of
        (i) a linear resin having terminal phenol moieties, said linear resin being a reaction product of a linear difunctional epoxy compound having terminal epoxy groups and a diphenol compound, and
        (ii) glycidol;
    (b) about 1% to about 15%, by weight of the composition, of a crosslinking agent.

9. The metal article of claim 8 wherein the coating composition is free of a halide-containing vinyl polymer.

10. The metal article of claim 8 wherein the article is a food container or a beverage container.

11. The composition of claim 1 wherein the linear difunctional epoxy compound is an epoxy resin.

12. The composition of claim 1 wherein the linear difunctional epoxy compound is prepared by reacting an epoxy compound with a linear difunctional compound having a general structural formula $$Y_1\text{-}X\text{-}Y_2,$$

wherein $Y_1$ and $Y_2$ are the same or different and are moieties having at least one active hydrogen atom, and X is a linear organic moiety.

13. The composition of claim 12 wherein X is selected from the group consisting of an alkyl, alkenyl, or alkynyl hydrocarbon moiety having a carbon chain of one to about twenty carbon atoms; an aryl or alkaryl group; a polymeric moiety having an $M_n$ of about 100 to about 10,000; and mixtures thereof.

14. The composition of claim 12 wherein X has an $M_n$ of about 100 to about 10,000, and is selected from the group consisting of bisphenol A, a diphenol, a dicarboxylic acid, a carboxylic acid-terminated polyester, a polyamide, a polyimide, a polyurethane, a polyether, a phenoxy, a polyol, and mixtures thereof.

15. The composition of claim 12 wherein $Y_1$ and $Y_2$, independently, are selected from the group consisting of hydroxy, amino, carboxyl, amido, sulfo, and imido.

16. The composition of claim 12 wherein the linear difunctional compound is selected from the group consisting of an α,ω-dicarboxylic acid, an α,ω-diamine, an α,ω-glycol, an α,ω-diamide, an α-ω-dimercaptan, each having a carbon chain of 2 to about 20 carbon atoms; a carboxylic acid-terminated linear polyester having an $M_n$ of about 2,000 to about 5,000; a polyalkylene glycol, a polyethylene glycol, a polypropylene glycol, a polybutylene glycol, a copolymer of ethylene glycol and propylene glycol, each having an $M_n$ of about 100 to about 10,000; a phenoxy resin having an $M_n$ of about 2,000 to about 10,000; and mixtures thereof.

17. The composition of claim 12 wherein the epoxy compound is selected from the group consisting of epichlorohydrin, glycidol, a linear difunctional epoxy compound having terminal epoxy group and a general structural formula:

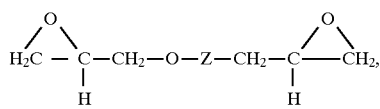

wherein Z is a residue of a glycol or a diphenol compound, and mixtures thereof.

18. The composition of claim 12 wherein the linear difunctional compound comprises a carboxylic acid-terminated polyester having an $M_n$ of about 1,000 to about 6,000.

19. The composition of claim 1 wherein the α-glycol endcapped resin is an α-glycol endcapped polyester-epoxy resin or an α-glycol endcapped epoxy resin.

* * * * *